United States Patent
Rajcok et al.

(10) Patent No.: US 10,529,048 B2
(45) Date of Patent: Jan. 7, 2020

(54) AUTOMATION TECHNOLOGY FOR ON-DEMAND DRIVERS

(71) Applicant: Driver Partners Inc., San Francisco, CA (US)

(72) Inventors: Matthew Rajcok, San Francisco, CA (US); Herby Coakley, San Francisco, CA (US)

(73) Assignee: Driver Partners Inc., San Francisco, CA (US)

( * ) Notice: Subject to any disclaimer, the term of this patent is extended or adjusted under 35 U.S.C. 154(b) by 0 days.

(21) Appl. No.: 16/266,574

(22) Filed: Feb. 4, 2019

(65) Prior Publication Data
US 2019/0244318 A1    Aug. 8, 2019

Related U.S. Application Data

(60) Provisional application No. 62/625,976, filed on Feb. 3, 2018.

(51) Int. Cl.
| | | |
|---|---|---|
| *G06Q 50/30* | (2012.01) | |
| *H04W 4/029* | (2018.01) | |
| *G01C 21/34* | (2006.01) | |

(52) U.S. Cl.
CPC ............ *G06Q 50/30* (2013.01); *H04W 4/029* (2018.02); *G01C 21/343* (2013.01); *G01C 21/3415* (2013.01)

(58) Field of Classification Search
CPC .. G06Q 50/30; G01C 21/3415; G01C 21/343; H04W 4/029
See application file for complete search history.

(56) References Cited

U.S. PATENT DOCUMENTS

| | | | |
|---|---|---|---|
| 2015/0324729 A1 | 11/2015 | Lord et al. | |
| 2016/0170731 A1* | 6/2016 | Maddern | G06Q 20/123 |
| | | | 717/176 |
| 2016/0364679 A1 | 12/2016 | Cao | |
| 2016/0364823 A1 | 12/2016 | Cao | |
| 2017/0310770 A1* | 10/2017 | Samaan | H04W 4/50 |

FOREIGN PATENT DOCUMENTS

WO    2016/094634 A1    6/2016

OTHER PUBLICATIONS

"AutoSwitch: A tool for Drivers to switch simultaneously between Uber & Lyft" Oct. 2, 2017, < https://medium.com/@autoswitchride/autoswitch-a-tool-for-drivers-to-switch-simultaneously-between-uber-lyft-832342a6a425>Retrieved on Aug. 2, 2019. (Year: 2017).*

(Continued)

*Primary Examiner* — Daniel Vetter
*Assistant Examiner* — Manal A. Alsamiri
(74) *Attorney, Agent, or Firm* — Cognition IP, P.C.; Bryant Lee

(57) ABSTRACT

A method and system may be used to manage one or more rideshare applications for drivers to increase automation and reduce the need for manual input. Information and settings of the one or more rideshare applications may be managed. Some management that may be provided includes filtering trip requests or automatically turning rideshare applications on or off.

18 Claims, 17 Drawing Sheets

(56) References Cited

OTHER PUBLICATIONS

"Free Android ride-share applications" Sep. 26, 2017, Maxymo Ultra,<https://medium.com/@RI_Blog/free-android-ride-share-applications-f58003e1fcbb> Retrieved on Aug. 2, 2019. (Year: 2017).*

"Gain.taxi switch for Uber/Lyft/Postmates, Easync Services" Android APPS on Google Play. Jul. 30, 2019 <https://play.google.com/store/apps/details?id=com.taxi.gain&hl=en_US> Retrieved on Aug. 2, 2019. (Year: 2019).*

"QRAD Rideshare Assistant for Drivers (auto switch), Quident,Inc." Android APPS on Google Play, Jul. 20, 2019 <https://play.google.com/store/apps/details?id=com.quident.android.qrad&hl=en_US>Retrieved on Aug. 2, 2019. (Year: 2019).*

"[APP][5.0+][FREE]Uber / Lyft Automated Driver" Aug. 5, 2017. <https://forum.xda-developers.com/android/apps-games/app-uber-lyft-automated-driver-t3652037> Retrieved on Aug. 2, 2019. (Year: 2017).*

Harry Campbell, "How Does Uber's Destination Filter Work?" The Rideshare Guy: A Blog and Podcast for Rideshare Drivers, Jan. 22, 2018. <https://therideshareguy.com/how-does-ubers-destination-filter-work/>.

"Ride Companion for Uber and Lyft Drivers," Android Apps on Google Play, Jan. 20, 2018. <https://play.google.com/store/apps/details?id=com.thunderstick.CarCompanion&hl=en>.

"Ride Fair—Why pay surge?" Android Apps on Google Play, Jan. 20, 2018. <https://play.google.com/store/apps/details?id=ninja.sesame.ridefair>.

Natasha Singer et al., "An App That Helps Drivers Earn the Most From Their Trips," The New York Times, May 9, 2015. <https://www.nytimes.com/2015/05/10/technology/a-dashboard-management-consultant.html>.

"Get your head out of your apps: The All-In-One Dashboard for Riders," Upshift—Optimize Your Driving on Uber, Lyft & More! Jan. 20, 2018 <http://upshift-app.com/>.

* cited by examiner

AUTOMATION TECHNOLOGY FOR ON-DEMAND DRIVERS

CROSS-REFERENCE TO RELATED APPLICATIONS

This application claims the benefit of U.S. Provisional Patent Application No. 62/625,976, filed Feb. 3, 2018, which is hereby incorporated by reference in its entirety.

FIELD OF THE INVENTION

The present invention generally relates to technology for on-demand drivers, and more particularly to a method and system of automating the workflow for on-demand drivers.

BACKGROUND

On-demand drivers are failing to maximize their earnings as a result of manual switching between on-demand driver applications on one or multiple devices while trying to maneuver through busy city streets. This burden creates an inefficient, unproductive and unsafe work environment for drivers in the pursuit of their next gig.

Inefficiencies Include: driver's inability to aggregate multiple platform applications; drivers have to manually evaluate opportunities, accept requests and switch between applications to make other applications inactive; drivers may be subject to penalties if they fail to sign out of other applications; drivers lack control over the type of opportunities provided to them resulting in opportunities with poor earning potential; drivers are not provided with earnings and performance metrics across platforms; unsafe conditions for everyone as drivers constantly interact with numerous devices while operating a moving vehicle.

Currently, the on-demand transportation and delivery industry is devoid of applications intended to facilitate the on-demand driver's experience.

There is a lack of software applications on the market that: automates driver touch events; screens trip request; allows drivers to set drive schedules; and, orchestrates hands-free management of multiple on-demand transportation and delivery applications. Currently drivers are forced to resort to driving with multiple phones, juggling multiple apps on one phone or deciding to drive for only one ride-sharing company because the alternative is too difficult and dangerous to manage.

SUMMARY OF THE INVENTION

One embodiment relates to a software application called Mystro, which is a mobile application that may act as a virtual assistant for on-demand drivers by enhancing driver's efficiency, earnings, productivity and safety. The embodiment may do this by aggregating on-demand transportation and delivery applications, as well as automatically managing and accepting trip requests based on the driver's pre-set preferences.

On-demand drivers value safety and efficiency which Mystro provides because Mystro may automate and customize the decision making process of accepting rides. Mystro may notify drivers of rides that do not meet their criteria and gives them an opportunity to manually accept them. Mystro may remove the burden of using multiple devices or engaging with multiple apps while providing a streamlined hands-free experience with on-demand transportation and delivery apps.

Mystro may solve this problem for on-demand drivers by automatically performing routine tasks for them. Some exemplary features include: Mystro App switching, where Mystro not only auto accepts rides but it also has some valuable settings to help drivers take control over the rides that Mystro accepts. Additional exemplary features that may be included in some embodiments are listed in the following paragraphs.

One embodiment relates to the Mystro Trip Request Filter. With the trip request feature users may filter out trip requests based on the length of time it takes to pick up a passenger.

One embodiment relates to the Mystro Passenger Rating Filter. With the passenger rating filter users may automatically filter out potential problem passengers with ease by setting the minimum passenger rating they are willing to accept.

One embodiment relates to the Mystro Car Pool filter. Most on-demand drivers hate those cheap carpool rides. With the Mystro app users may filter out these requests as well.

One embodiment relates to the Mystro Surge Filter. Users may filter out trips that are not surging at a desired amount and therefore only accept the best paying trips.

One embodiment relates to the Auto On/Off Feature. With this feature, once users select which platforms they want Mystro to manage, the user may activate Mystro and Mystro may activate platforms in the queue automatically. Also, it may work in reverse, as by taking Mystro offline, it may take the on-demand apps in queue off-line as well.

One embodiment relates to Auto-Accept. Mystro may automatically accept all trip requests the user allows it to accept by configuring the preferences settings. This feature may allow on-demand drivers to keep their eyes on the road and can reduce distracting driving among on-demand drivers by up to 80%.

One embodiment relates to Mystro Bar. Mystro bar is a feature that may allow users to monitor the details of the current trip while navigating to a destination. It may show platform's logo, type of request, name of client, client rating, whether it's a pick-up or drop-off, and also gives the user the ability to change navigation apps on the fly.

One embodiment relates to Mystro Stats and Analytics. Mystro may provide stats such as miles driving, down time, drive time, acceptance rates, best areas to drive, best times to drive, driving patterns, all across multiple platforms the on-demand driver uses.

One embodiment relates to "The Mystro." The Mystro may be a stand-alone hardware device, such as a mobile device running Android OS or iOS, that runs only the Mystro automation software. The device may come pre-loaded with apps that have a relationship with the provider of the Mystro application and include a data plan. The Mystro may be used for exclusively working as an on-demand driver and can remain in the vehicle.

DETAILED DESCRIPTION

Figure 1:
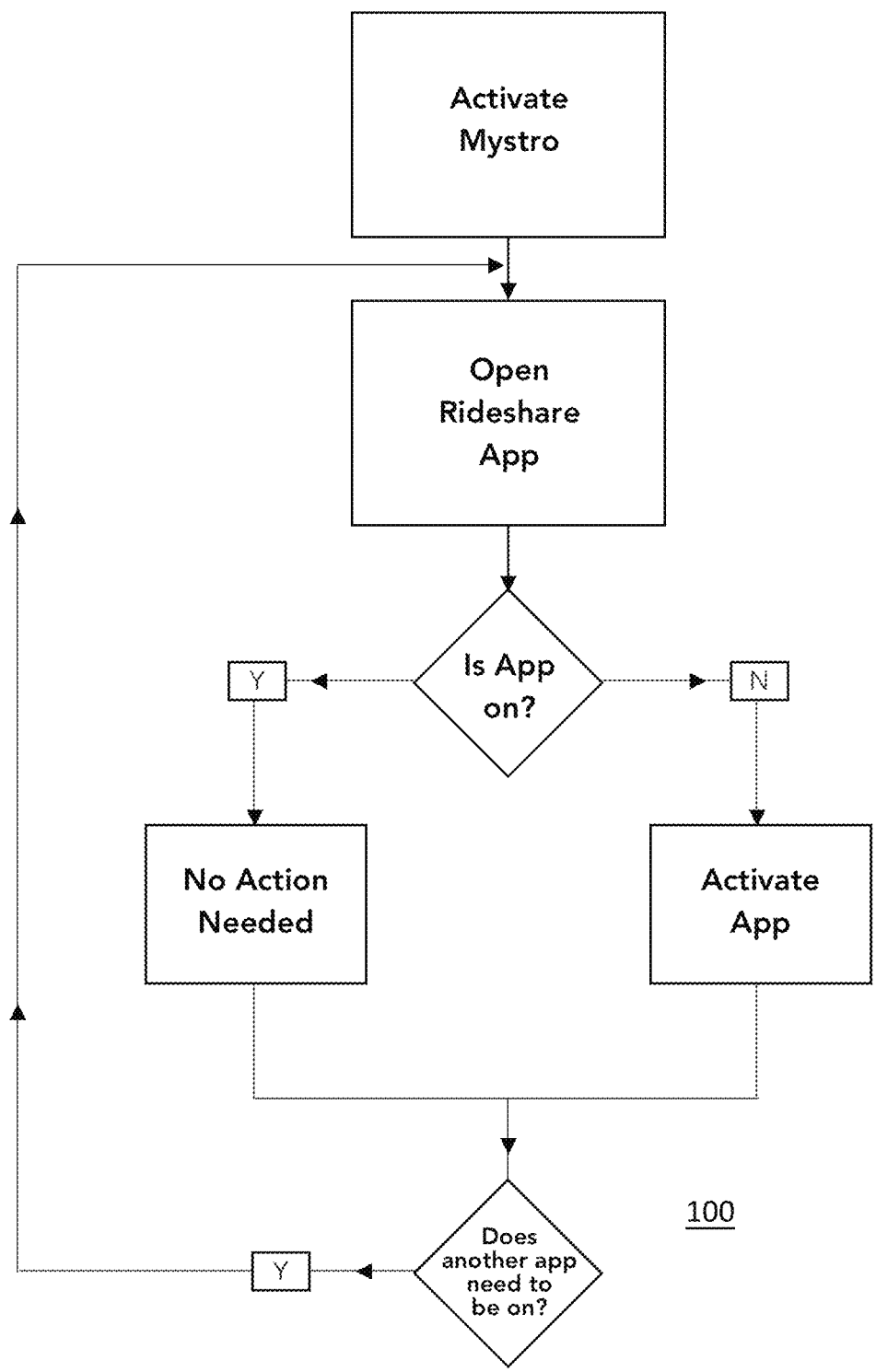
FIG. 1 illustrates an exemplary method that may be used in one embodiment.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Embodiments of the invention may comprise one or more computers. Embodiments of the invention may comprise software and/or hardware. Some embodiments of the invention may be software only and may reside on hardware. A computer may be special-purpose or general purpose. A computer or computer system includes without limitation electronic devices performing computations on a processor or CPU, personal computers, desktop computers, laptop computers, mobile devices, cellular phones, smart phones, PDAs, pagers, multi-processor-based devices, microprocessor-based devices, programmable consumer electronics, cloud computers, tablets, minicomputers, mainframe computers, server computers, microcontroller-based devices, DSP-based devices, embedded computers, wearable computers, electronic glasses, computerized watches, and the like. A computer or computer system further includes distributed systems, which are systems of multiple computers (of any of the aforementioned kinds) that interact with each other, possibly over a network. Distributed systems may include clusters, grids, shared memory systems, message passing systems, and so forth. Thus, embodiments of the invention may be practiced in distributed environments involving local and remote computer systems. In a distributed system, aspects of the invention may reside on multiple computer systems.

Embodiments of the invention may comprise computer-readable media having computer-executable instructions or data stored thereon. A computer-readable media is physical media that can be accessed by a computer. It may be non-transitory. Examples of computer-readable media include, but are not limited to, RAM, ROM, hard disks, flash memory, DVDs, CDs, magnetic tape, and floppy disks.

Computer-executable instructions comprise, for example, instructions which cause a computer to perform a function or group of functions. Some instructions may include data. Computer executable instructions may be binaries, object code, intermediate format instructions such as assembly code, intermediate format instructions such as assembly language, source code, byte code, scripts, and the like. Instructions may be stored in memory, where they may be accessed by a processor. A computer program is software that comprises multiple computer executable instructions.

A database is a collection of data and/or computer hardware used to store a collection of data. It includes databases, networks of databases, and other kinds of file storage, such as file systems. No particular kind of database must be used. The term database encompasses many kinds of databases such as hierarchical databases, relational databases, post-relational databases, object databases, graph databases, flat files, spreadsheets, tables, trees, and any other kind of database, collection of data, or storage for a collection of data.

A network comprises one or more data links that enable the transport of electronic data. Networks can connect computer systems. The term network includes local area network (LAN), wide area network (WAN), telephone networks, wireless networks, intranets, the Internet, and combinations of networks.

In this patent, the term "transmit" includes indirect as well as direct transmission. A computer X may transmit a message to computer Y through a network pathway including computer Z. Similarly, the term "send" includes indirect as well as direct sending. A computer X may send a message to computer Y through a network pathway including computer Z. Furthermore, the term "receive" includes receiving indirectly (e.g., through another party) as well as directly. A computer X may receive a message from computer Y through a network pathway including computer Z.

Similarly, the terms "connected to" and "coupled to" include indirect connection and indirect coupling in addition to direct connection and direct coupling. These terms include connection or coupling through a network pathway where the network pathway includes multiple elements.

To perform an action "based on" certain data or to make a decision "based on" certain data does not preclude that the action or decision may also be based on additional data as well. For example, a computer performs an action or makes a decision "based on" X, when the computer takes into account X in its action or decision, but the action or decision can also be based on Y.

In this patent, "computer program" means one or more computer programs. A person having ordinary skill in the art would recognize that single programs could be rewritten as multiple computer programs. Also, in this patent, "computer programs" should be interpreted to also include a single computer program. A person having ordinary skill in the art would recognize that multiple computer programs could be rewritten as a single computer program.

The term computer includes one or more computers. The term computer system includes one or more computer systems. The term computer server includes one or more computer servers. The term computer-readable medium includes one or more computer-readable media. The term database includes one or more databases.

An embodiment is disclosed herein describing a software application called Mystro that operates as an on-demand driving aggregation platform. However, it should be understand that the invention is not limited to this embodiment. Features of this embodiment are exemplary and none of the features disclosed herein should be considered necessary to the invention unless explicitly stated otherwise. It is contemplated that each of the features of the Mystro embodiment may be used independently of each other. It is not required that all the features of the Mystro application be included in a particular embodiment. Embodiments of the invention may include only a single feature from the Mystro application. Moreover, additional features not described herein may be added consistent with the invention.

Mystro, which is one embodiment herein, may be referred to as an on-demand driving aggregation platform. The term on-demand driving aggregation platform is used to refer to a software and/or hardware system for managing one or more rideshare applications. Mystro may also be referred to as a workflow management application for rideshare applications, workflow automation for on-demand drivers, a management tool for on-demand driving applications, and so on.

A rideshare application is an application that allows passengers to request rides from drivers. In some rideshare applications, the drivers are members of the general population rather than being employees of the rideshare company. Examples of rideshare applications include Uber, Lyft, Gett, and Juno. The drivers in these rideshare applications are generally treated as contractors and often drive in their spare time. A rideshare application may also be referred to as an on-demand driving application.

FIG. 1 illustrates an exemplary method 100 that may be performed in Mystro to activate two or more rideshare applications. In method 100, a request may be received from a user to activate Mystro, an on-demand driving aggregation platform. Mystro may then be activated. Mystro may open a first rideshare application. Mystro may determine whether the first rideshare application is on. If the first rideshare application is on, no action may be needed. If the first rideshare application is off, Mystro may activate the first rideshare application. Mystro may then check and determine whether another rideshare application needs to be on.

In one example, Mystro may determine that a second rideshare application needs to be on. Mystro may open the second rideshare application. Mystro may determine whether the second rideshare application is on. If the second rideshare application is on, no action may be needed. If the second rideshare application is off, Mystro may activate the second rideshare application. The process may repeat and Mystro may then check and determine whether another rideshare application needs to be on (such as a third rideshare application, fourth rideshare application, and so on). The process may end when Mystro determines that no other rideshare applications need to be on.

Figure 2:
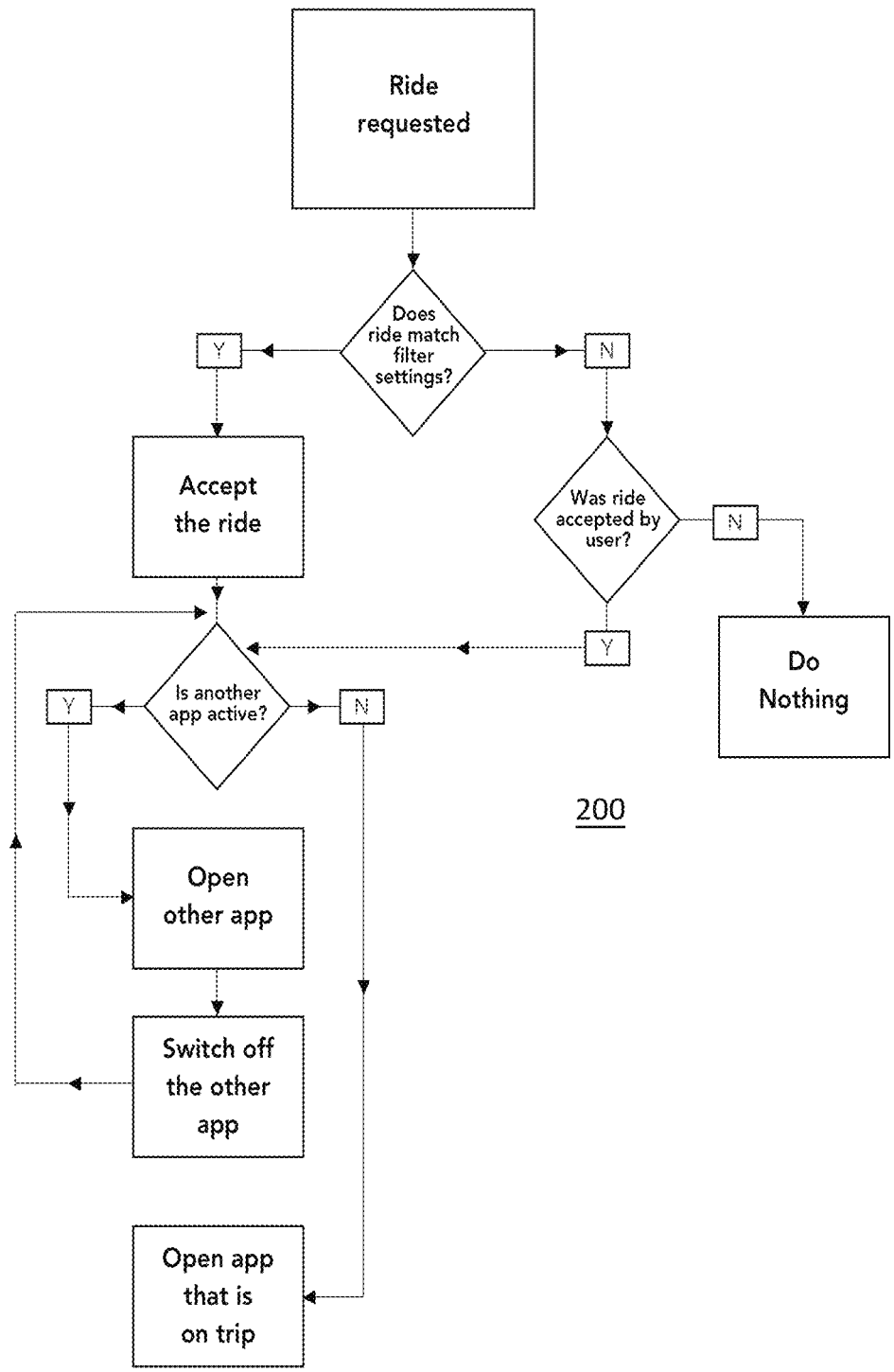
FIG. 2 illustrates an exemplary method that may be used in one embodiment.

FIG. 2 illustrates an exemplary method 200 that may be performed in Mystro to accept a ride on a first rideshare application and turn off a second rideshare application. In method 200, a ride request may be received from a first rideshare application. Mystro may determine whether one or more characteristics of the ride match (e.g. pass) one or more ride filter settings set by a user. If it is determined that the one or more characteristics of the ride match (e.g. pass) the one or more ride filter settings set by a user, then Mystro may automatically accept the ride without user input. On the other hand, if the ride does not match the one or more ride filter settings of the user, then Mystro may present the option to the user to accept the ride or not. If the ride is not accepted, then the process ends. However, if input from the user is received to accept the ride, then Mystro accepts the ride and the process continues.

Once the ride is accepted by Mystro, Mystro may determine whether a second rideshare application is active. If so, Mystro may open the second rideshare application and switch off the second rideshare application. In doing so, Mystro may thus solve the problem where the user has accepted a ride on a first rideshare application like Uber but then may receive ride requests on a second rideshare application like Lyft when the user is not available. This is advantageous because drivers may be penalized for declining or not accepting large numbers rides. Moreover, it may be distracting to a user to receive ride requests on a second rideshare application when the user has already accepted a ride on a first rideshare application.

Once the second rideshare application is switched off, Mystro may repeat the process of checking whether other rideshare applications are active and need to be switched off (such as a third rideshare application, fourth rideshare application, and so on). Once all other rideshare applications are switched off (other than the one where the trip was accepted), Mystro may then open the rideshare application in which the trip is active.

Optionally, in some embodiments of method 200, Mystro may determine whether one or more, or all, characteristics of the ride match (e.g. pass) all the ride filter settings set by a user. If it is determined that one or more, or all, the characteristics of the ride match (e.g. pass) all the ride filter settings set by a user, then Mystro may automatically accept the ride without user input. On the other hand, if the ride does not match all the ride filter settings of the user, then Mystro may present the option to the user to accept the ride or not.

Figure 3:
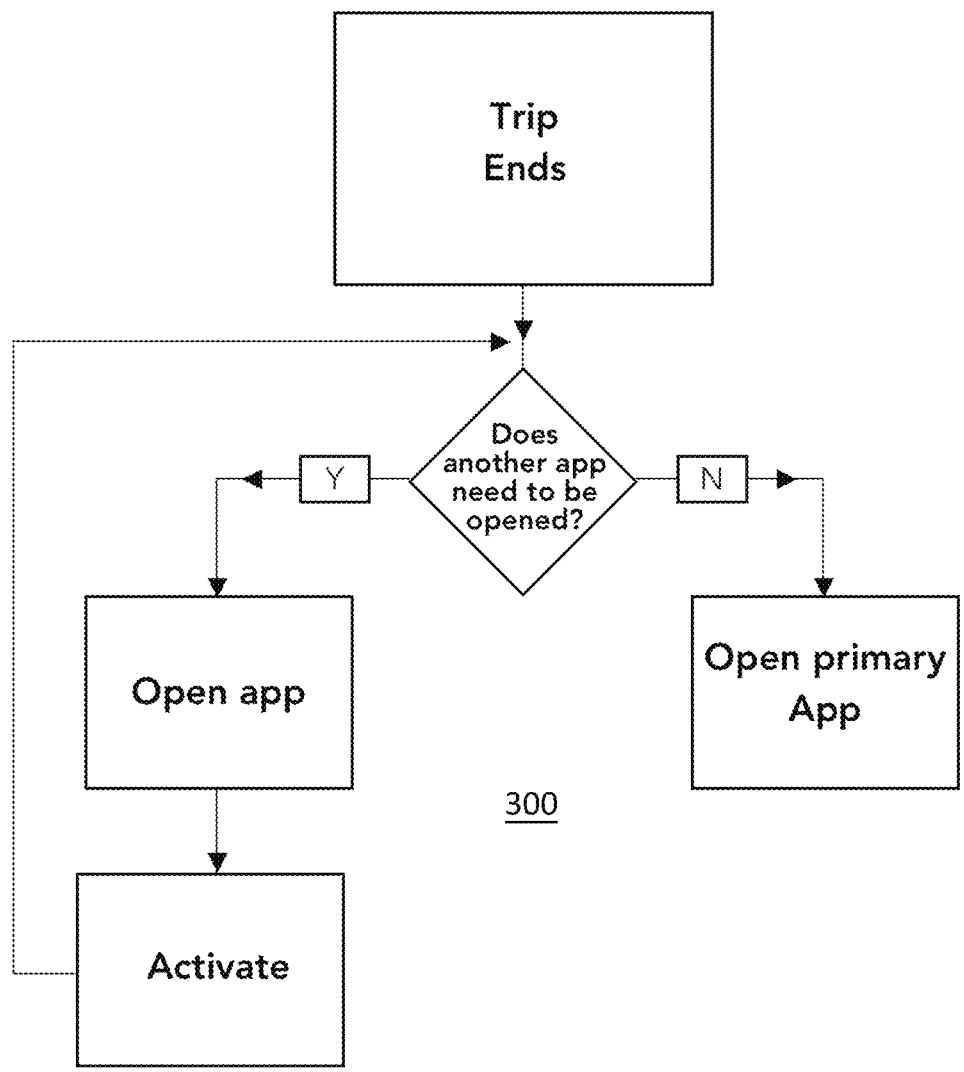
FIG. 3 illustrates an exemplary method that may be used in one embodiment.

FIG. 3 illustrates an exemplary method 300 that may be performed in Mystro to end a trip in a first rideshare application and reactivate a second rideshare application that was deactivated. Method 300 may include a step of ending a trip in a first rideshare application. Once the trip is ended, Mystro may determine whether it needs to turn back on a second rideshare application. For example, Mystro may have deactivated the second rideshare application because a trip was accepted in the first rideshare application as was discussed in the context of method 200. If Mystro determines that it needs to open and turn back on a second rideshare application, then it may open the second rideshare application and activate it. The process may repeat where Mystro checks for additional rideshare applications that need to be opened and turned back on, and opens and turns them on if needed (such as a third rideshare application, fourth rideshare application, and so on). If no more rideshare applications need to be turned on, then Mystro may return to and open the first rideshare application, which may be the primary rideshare application.

Figure 4:
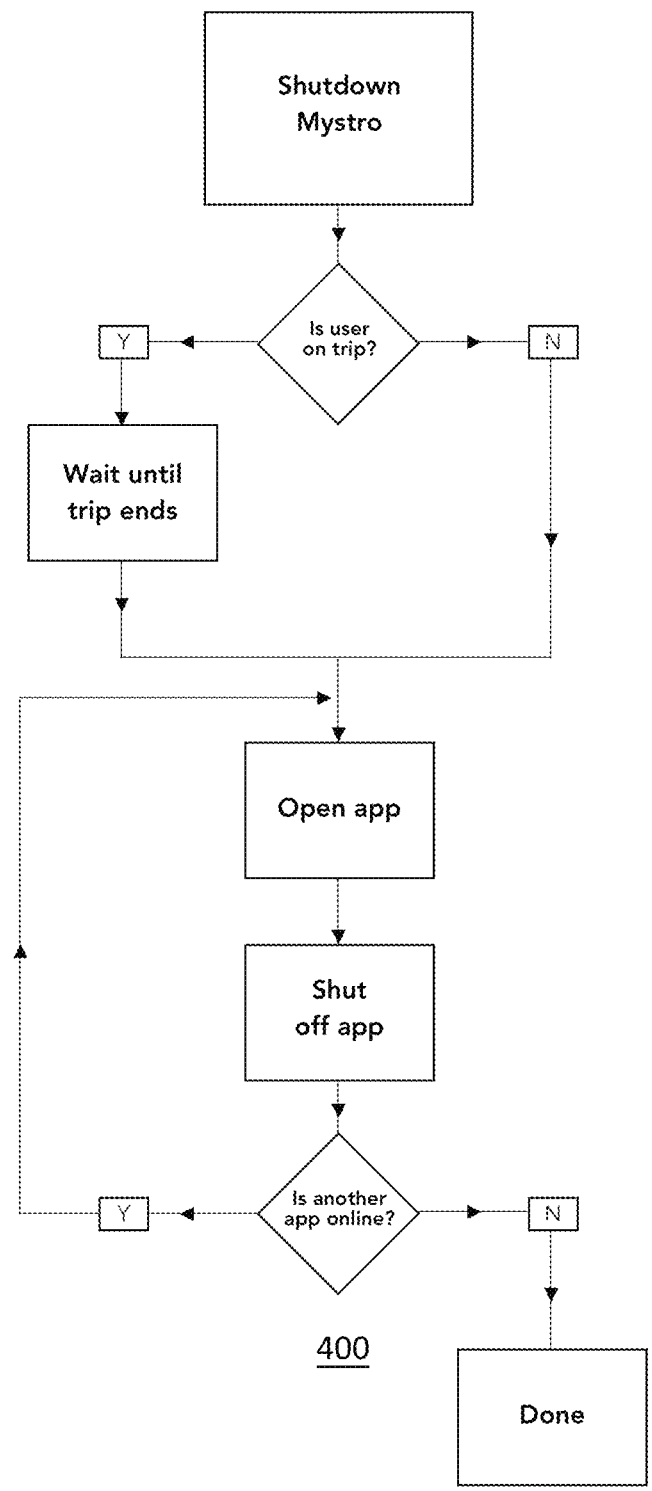
FIG. 4 illustrates an exemplary method that may be used in one embodiment.

FIG. 4 illustrates an exemplary method 400 that may be performed in Mystro to close Mystro and shut down one or more rideshare applications. Method 400 may include receiving a request to shutdown Mystro. Mystro may then determine whether the user is currently on a trip. If so, Mystro may wait until the trip ends to proceed with shutdown. If not, Mystro may proceed immediately as shown in the flow chart.

Once there are no pending trips, Mystro may open each rideshare application under its management and shut them down. Thus, Mystro may open a first rideshare application and shutdown the first rideshare application. Mystro may then determine whether additional rideshare applications are active. If Mystro determines that a second rideshare application is active, it may open the second rideshare application and shut it down. Once each of the rideshare applications have been shutdown (such as a third rideshare application, fourth rideshare application, and so on), Mystro may determine that no other rideshare applications are active or online and the shutdown process may end.

Figure 5:
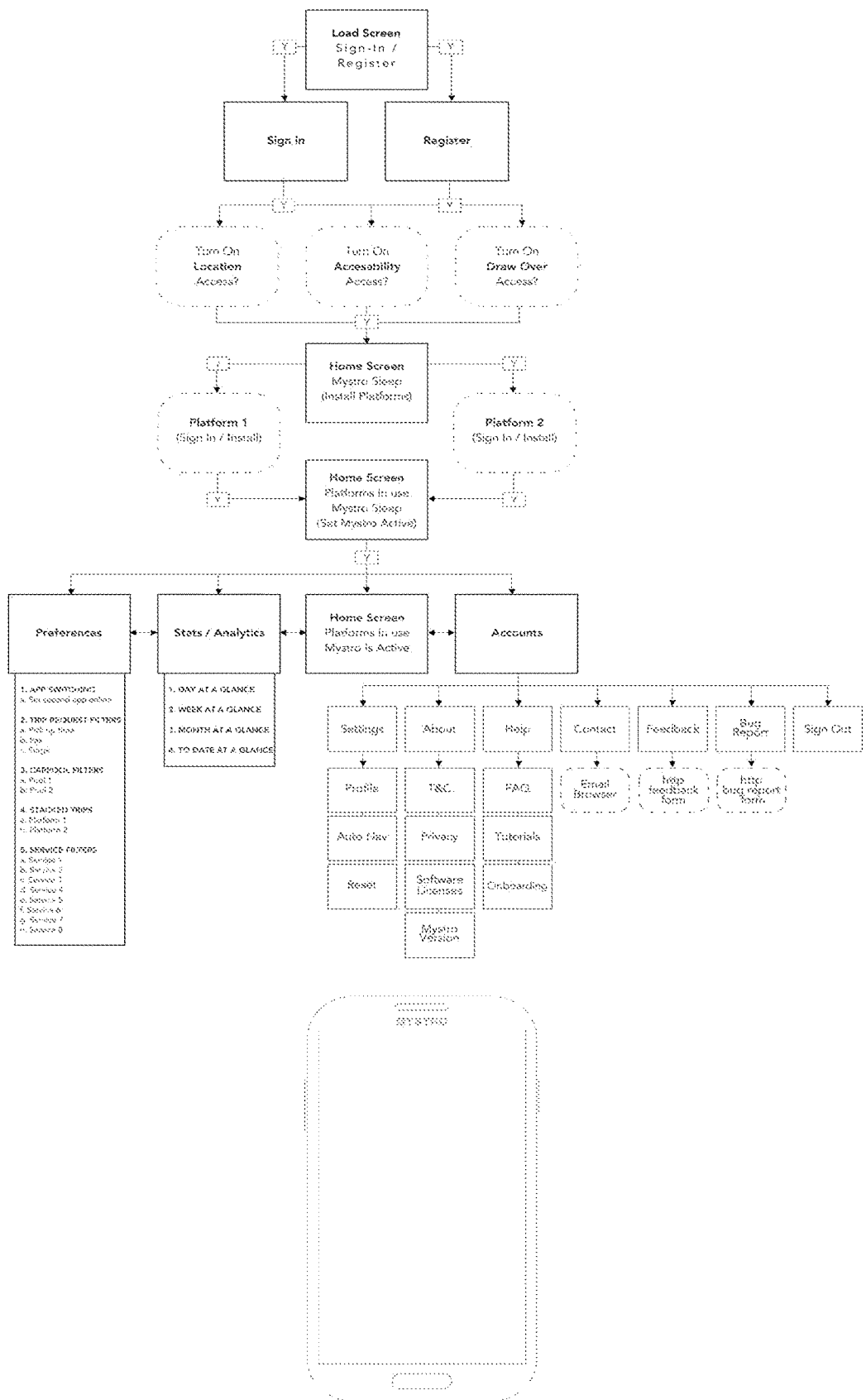
FIG. 5 illustrates a flow chart that illustrates an exemplary flow in an application embodiment.

FIG. 5 illustrates an exemplary flow chart illustrating the flow in Mystro. Initially, a load screen may be displayed to the user. The load screen may display the option to sign-in or register. The load screen may allow the user to register if the user does not have an account. Registration may create an account for the user. If the user has an account, the load screen may allow the user to log-in using credentials such as a user name and password.

Once the user has accessed their account by registering or signing in, the user may be presented with one or more options. One of the options may be to turn on location access to allow the Mystro application to access the user's location from the mobile device's location services, such as by the Global Positioning System (GPS) or inference of location from Wi-Fi or Bluetooth signals. One of the options may be an option to turn on accessability services to allow access by users with a disability. For example, an accessibility service may be a screen reader that reads text and content from the screen. One of the options may be to allow draw over access by Mystro. Setting this option to on may allow Mystro to draw over other apps, such as a rideshare application. Each of these options may be turned on or turned off.

After completing these steps, a home screen may be displayed. Mystro may initiate a process to install one or more rideshare applications and then go into sleep mode as those one or more rideshare applications are installed. In the figure, it is illustrated that two rideshare applications are installed, but more or fewer rideshare applications can also be used. For each rideshare application, the user may be requested to install the rideshare application, register to create an account, and sign in. Once the one or more rideshare applications are installed and the user is signed in, those rideshare applications may be in use. Mystro may then be set into active mode from sleep mode.

The Mystro application may present one or more screens such as a Preferences screen, Stats/Analytics screen, Home Screen, and Accounts screen.

In the Home Screen, one of the rideshare applications may be in use. The user may be, for example, waiting for a trip, on the way to pick up a passenger, or on a trip. Mystro is active at this point.

In the Preferences screen, settings may be displayed to the user with user interface elements so that the settings may be changed and manipulated by the user. An App Switching option may be displayed to allow the user to set the amount of time before switching on a second rideshare application. In an embodiment, a first rideshare application may be designated as the primary rideshare application, which may be on all the time. A second rideshare application may be designated as the secondary rideshare application, which may be toggled on according to the App Switching option. The option may be set to determine a delay that will occur between the turning on of the primary rideshare application and when the secondary rideshare application will be turned on by Mystro. The option may be set so that the two rideshare applications both turn on immediately. The option may be set so that the secondary rideshare application never turns on.

Trip Request Filters may be set where trips meeting one or more, or all, of the filters may be auto-accepted by Mystro, but trips that fail to meet one or more of the filters will not be auto-accepted and must be accepted manually by the user. One of the filters may allow the user to set a threshold amount of time to passenger pick up, where trips with passenger pick up time above the threshold may be filtered. The time may be designated, for example, in minutes or seconds. One of the filters may allow the user to set a threshold passenger rating, where passengers below the threshold passenger rating may be filtered. One of the trips filters may allow the user to set a threshold surge amount, where trips with a surge amount below the threshold surge amount may be filtered.

One of the filters may allow the user to toggle whether he or she will accept trips for a carpool service. Carpool services include, for example, Uber Express Pool, Uber Express, and Lyft Line. A plurality of filters may be provided where each filter controls whether the user will accept trips for one particular carpool service.

One of the filters may allow the user to toggle whether he or she will accept trips that are stacked, meaning that the new trip request comes in while the user is already on a trip to drop off a passenger. The trips are considered stacked because the user is required to pick up a new passenger while still on a trip to drop off a passenger. A plurality of filters may be provided where each filter controls whether the user will accept stacked trips for one particular rideshare application.

One of the filters may allow the user to toggle where he or she will accept trips that correspond to a certain service. Services include, for example, UberX, UberXL, Uber SUV, Uber Select, Uber Black, Uber Pool, Uber Express Pool, Lyft Line, Lyft, Lyft Plus, Lyft Premier, Lyft Lux, and Lyft Lux SUV. A plurality of filters may be provided, one for each service, to allow the user to toggle on or off each service.

The Preferences screen may include an Auto On/Off Feature. With this feature, once users select which platforms they want Mystro to manage, the user may activate Mystro and the platforms in their queue may be turned on automatically. Also, works in reverse, as by taking Mystro offline, it may take the on-demand apps in queue off-line as well.

The Stats/Analytics screen may present stats and analytics about the user's driving. Sub-sections or sub-screens of this screen may display, for example, statistics or analytics per day, per week, per month, or to date. These may be presented as summary screens that display the statistics or analytics at a glance.

The Stats/Analytics screen may provide stats such as miles driving, down time, drive time, acceptance rates, best areas to drive, best times to drive, driving patterns, all across multiple platforms the on-demand driver uses.

The Accounts screen may display information related to the user's account. A Settings screen may display a user profile. It may also display an auto-navigate option, which when activated will route the user to a pick-up destination without the user having to touch the device. The Settings screen may also present a Reset option that allows the application to be reset.

An About screen may include Terms and Conditions, a Privacy Policy, a notice of Software Licenses, and an indication of the Mystro version. A Help screen may display an FAQ, one or more tutorials, and onboarding. A Contact screen may provide user interface elements for contacting the provider of the Mystro application. This may include an email address that links to an email browser when activated. A Feedback screen may include an HTTP feedback form for accepting input from the user and providing it to the provider of the Mystro application. A Bug Report screen may include an HTTP bug report form for accepting input from the user about bugs and providing it to the provider of the Mystro application. A Sign Out option may allow the user to sign out of Mystro.

Figure 6:
FIG. 6 illustrates exemplary screens of an application embodiment.

FIG. 6 illustrates four exemplary Mystro screens. Screen 601 illustrates the Home Screen of Mystro. A map is shown with the user's current location. Two rideshare applications are shown to be available and in-use. Buttons are shown to switch between screens such as the Home Screen, Preferences screen, Stats and Analytics screen, and Account screen.

Screen 602 shows the Stats/Analytics screen of Mystro. The Stats/Analytics screen allows viewing statistics and analytics for today, the week, month, and to date. For each of these options, statistics and analytics may be shown for driver time, down time, miles driven, completed trips, and acceptance rate (e.g. acceptance rate of trips).

Screen 603 shows a portion of an exemplary Preferences screen. An App Switching option is shown. In this example, Lyft is set as the primary rideshare application and Uber is set as the secondary rideshare application. User interface elements may be displayed allowing the user to select between Lyft and Uber as the primary rideshare application. A slider is display that may be moved left or right and allows the user to set the amount of delay between the first rideshare application turning on and the second rideshare application turning on. A trip request filter is shown for setting a threshold acceptable time to passenger pick up.

Screen 604 shows a following portion of the exemplary Preferences screen. An acceptable passenger rating filter is shown for setting a threshold passenger rating for filtering. An acceptable surge filter is shown for setting a threshold surge amount for filtering. A carpool filter is shown for Uber Pool to allow the user to toggle between filtering Uber Pool requests. Another carpool filter is shown for Lyft Line to allow the user to toggle between filtering Lyft Line requests. A stacked trips filter is shown for allowing the user to toggle between filtering stacked trips in Uber. An additional stacked trips filter may be shown for Lyft.

Figure 7:
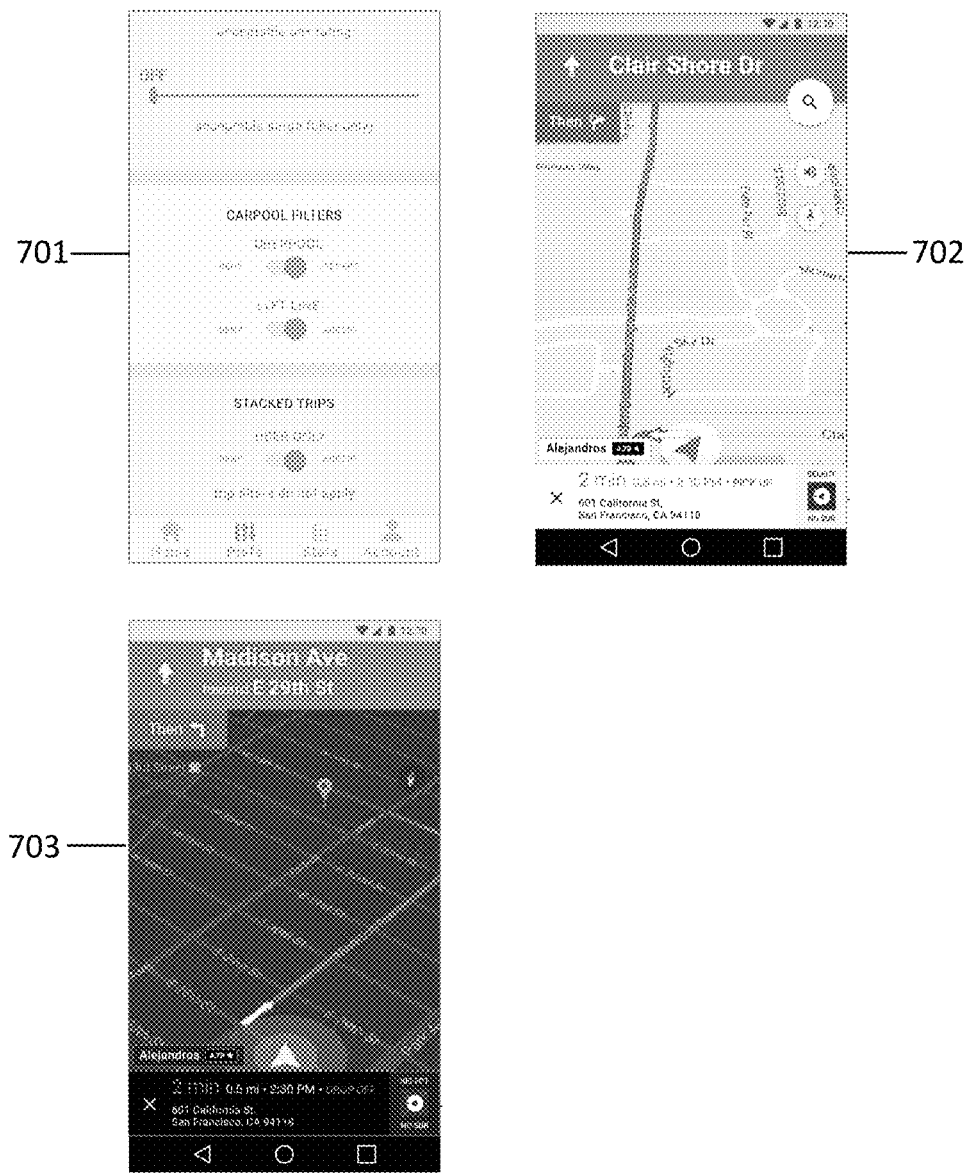
FIG. 7 illustrates exemplary screens of an application embodiment.

FIG. 7 illustrates additional exemplary Mystro screens. Screen 701 shows a Preferences screen. The Preferences screen shows a request filter by passenger rating, request filters for carpool filters, and stacked trips filters, as previously discussed. Screen 702 shows an active mode of the Mystro app where the user is on a trip to pick up a user named Alejandros with a displayed passenger rating. The screen 702 shows the route to the passenger. At the top of the screen, driving directions are displayed. It displays a box at the bottom of the screen that may be referred to as the Mystro bar. Mystro bar may allow users to monitor the details of the current trip while navigating to a destination. It may show platform's logo, type of request, name of client, client rating, whether it's a pick-up or drop-off, and also may give the user the ability to change navigation apps on the fly. It may include the time to pick up, distance to pick up, estimated time of pick up, and address.

Screen 703 shows an active mode of the Mystro app where the user is on a trip to drop off a user named Alejandros. The screen 703 shows similar information as discussed in the context of screen 702.

Figure 8:
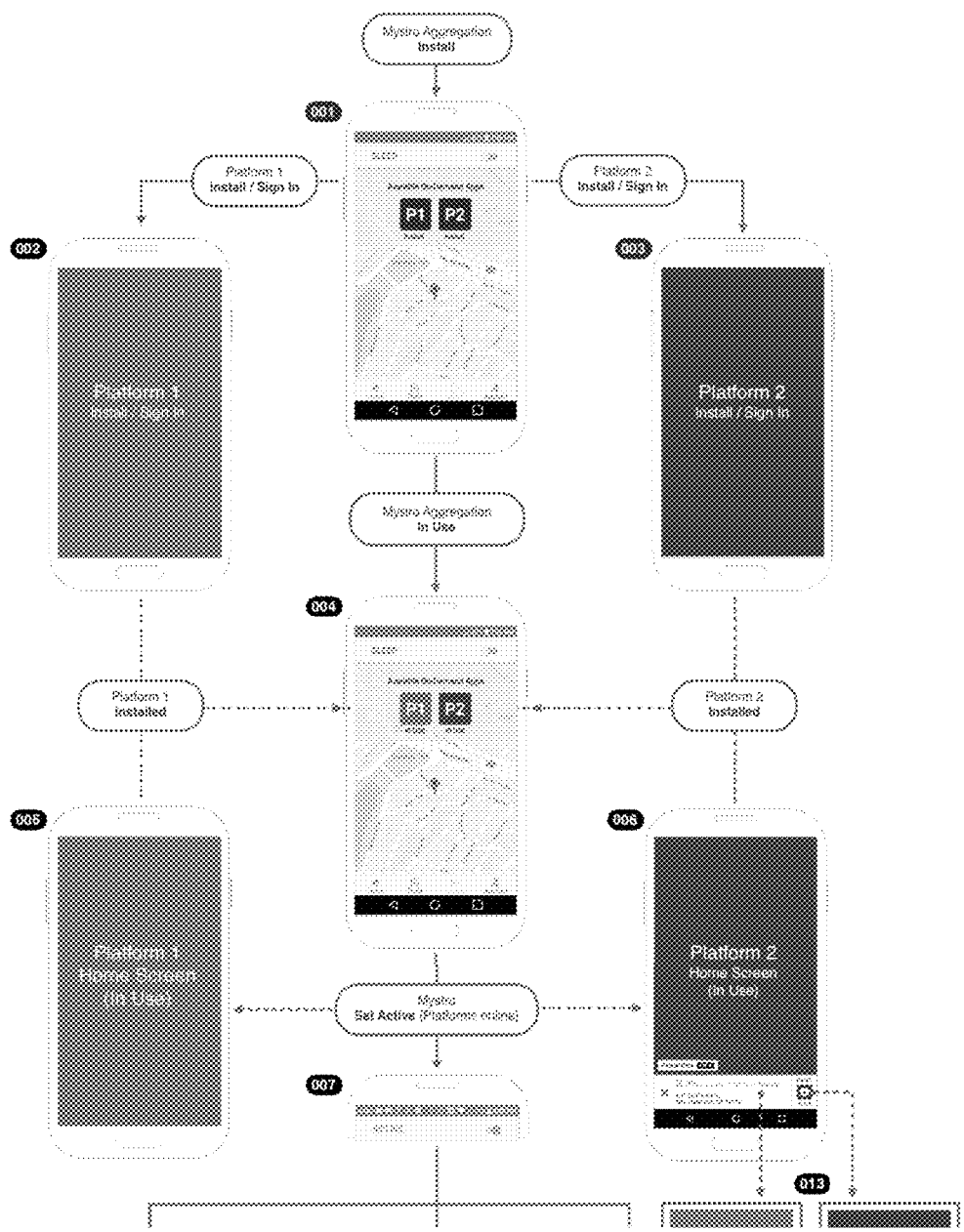
FIGS. 8-9 illustrate exemplary screens in an exemplary flow of the Mystro application.
Figure 9:
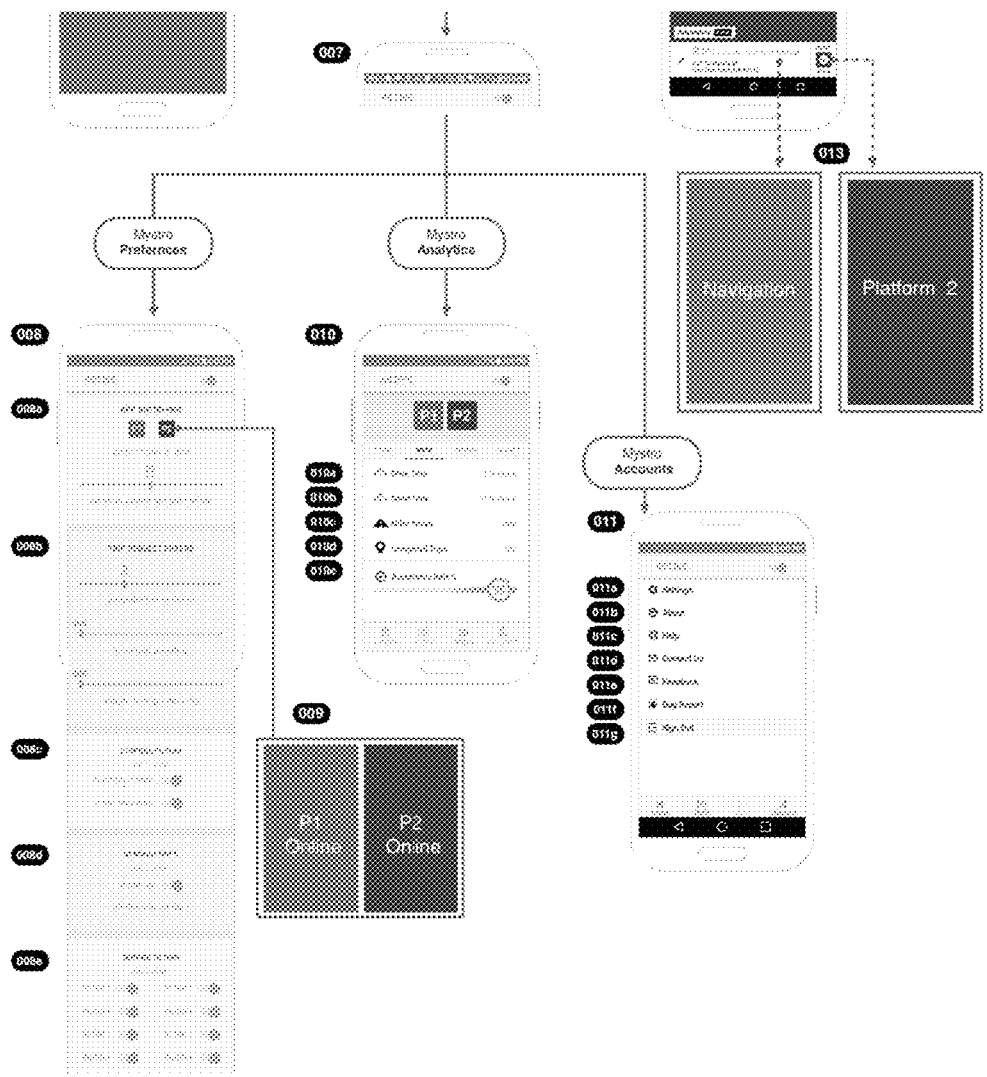

FIGS. 8-9 illustrate exemplary screens in an exemplary flow of the Mystro application. Mystro may be installed. Mystro may display a screen 001 with a map and available rideshare applications. A first rideshare application may show an install and sign in screen 002. A second rideshare application may show an install and sign in screen 003. Mystro may display that the first and second rideshare applications are now available in screen 004. After installation of the first rideshare application, the home screen 005 of the first rideshare application may be displayed. After installation of the second rideshare application, the home screen 006 of the second rideshare application may be displayed. The second rideshare application may provide navigation and status information 013.

Mystro may enter active mode as shown in 007 and the first and second rideshare applications may go online. Mystro may display a preferences screen 008. Preference option 008a may allow setting App Switching options and portion 009 may illustrate which rideshare applications are online. Preference option 008b may allow setting trip request filters. Preference option 008c may allow setting carpool filters. Preference option 008d may allow setting stacked trips filters. Preference option 008e may allow setting service filters.

Mystro may display an Analytics screen 010. Analytics screen 010 may display drive time 010a, down time 010b, miles driven 010c, completed trips 010d, and acceptance rates 010e.

Mystro may display an Accounts screen 011. Accounts screen 011 may include a menu for selecting the display of settings 011a, about 011b, help 011c, contact us screen 0113, feedback 011e, bug report 011f, and the option to sign out 011g.

Figure 10:
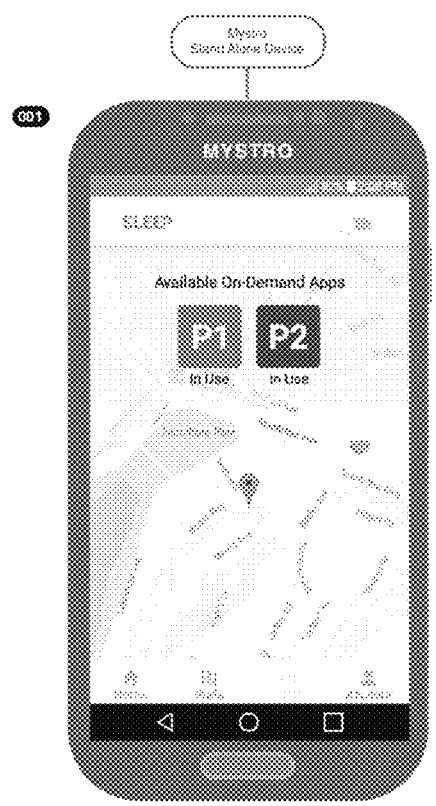
FIG. 10 illustrates an exemplary dedicated, stand-alone device.

FIG. 10 illustrates a dedicated, stand-alone device entitled "The Mystro." The Mystro may be a stand-alone hardware device, such as a mobile device running Android OS or iOS, that runs only the Mystro automation software. The device may come preloaded with apps that have a relationship with the provider of the Mystro application and include a data plan. With the device, drivers will not need a personal phone and data plan. The Mystro may be used for exclusively working as an on-demand driver and can remain in the vehicle.

Figure 11:
FIG. 11 illustrates an exemplary driver earnings screen.

FIG. 11 illustrates an exemplary driver earnings screen 1100. The driver earnings screen may display the earnings 1101 of the driver in configurable time intervals, such as daily, weekly, monthly, and annually. Time range selector 1102 may allow choosing from different time intervals or selecting a date range. Additional fields may be displayed including the amount of drive time, down time, miles driven, completed trips, acceptance rate (the rate at which the driver accepts rides request), and a cancellation rate (the rate at which the driver cancels rides). User interface elements 1103 may also allow the user to choose to view their statistics per app, where apps may include Uber, Lyft, Gett, Juno, Postmates, and others. When a particular app is chosen, the statistics are shown based on the activities in that app. For example, Mystro displays the driver's earnings for that app only.

Figure 12:
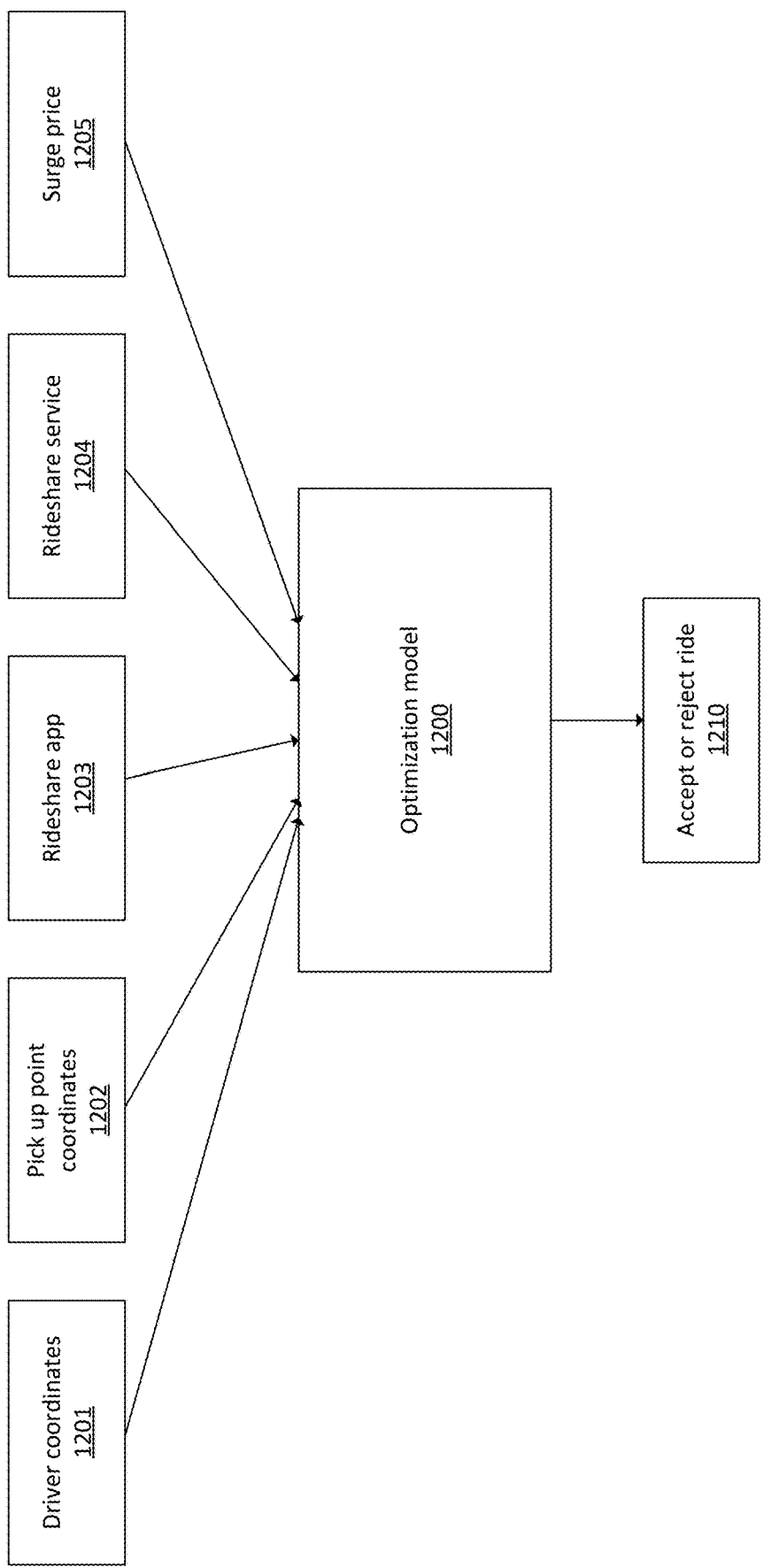
FIG. 12 illustrates an exemplary optimization model that may be used in some embodiments to automatically accept a trip or not.

FIG. 12 illustrates an exemplary optimization model 1200 that may be used in some embodiments to automatically accept a trip or not. The optimization model may select to accept or reject trips to optimize the driver's hourly earnings from ridesharing. For example, it may be desirable to reject trips that are expected to be low value and take up the driver's time and cost him or her the opportunity to accept higher value trips. In one approach, the optimization model 1200 may accept as input the coordinates of the driver 1201, the coordinates of the pickup point of the trip 1202, the identity of the rideshare app 1203, the identity of the service in the rideshare app 1204, the surge price 1205, and other values. Additional values that may be accepted as inputs include the current weather, current location such as city, the gas mileage of the vehicle that the user is driving, driver bonus information, and the driver's market. The optimization model 1200 may comprise internal model parameters that operate on the inputs and generate an output value. The output value may be a value indicating whether Mystro should accept or reject the trip in order to maximize driver hourly earnings. In one embodiment, the output value is a Boolean value of yes or no (or 0 or 1). In other embodiments, the output value may be a probability value between 0 and 1 indicating the likelihood that the driver should accept the trip to optimize his or her hourly earnings according to the model. In some embodiments, the optimization model 1200 may be a machine learning model such as linear regression, logistic regression, neural networks, random forests, Bayesian classification, reinforcement learning, support vector machines (SVMs), genetic algorithms, or any other model that can be customized based on training data.

The optimization model 1200 may be trained using training examples, where the training examples may comprise input values of the same type as those used during inference, as described elsewhere. The training examples may also comprise an output label that indicates the desired output of the model. In some examples, the output label may comprise a binary value of 1 or 0 indicating whether the model should be trained to accept or reject the trip. In other examples, the output label may comprise the earnings of the driver, either from the trip or on an hourly basis. Using the output labels the optimization model 1200 may be trained to accept and reject trips to optimize earnings for the driver. In one example of training the optimization model 1200, the training examples are input to the optimization model 1200, and the outputs of the optimization model 1200 are compared with the output labels. The differences between the outputs of the optimization model 1200 and the output labels are used to adjust the internal model parameters of the optimization model 1200 to make it more accurate in predicting the output labels of the training examples.

Figure 13:
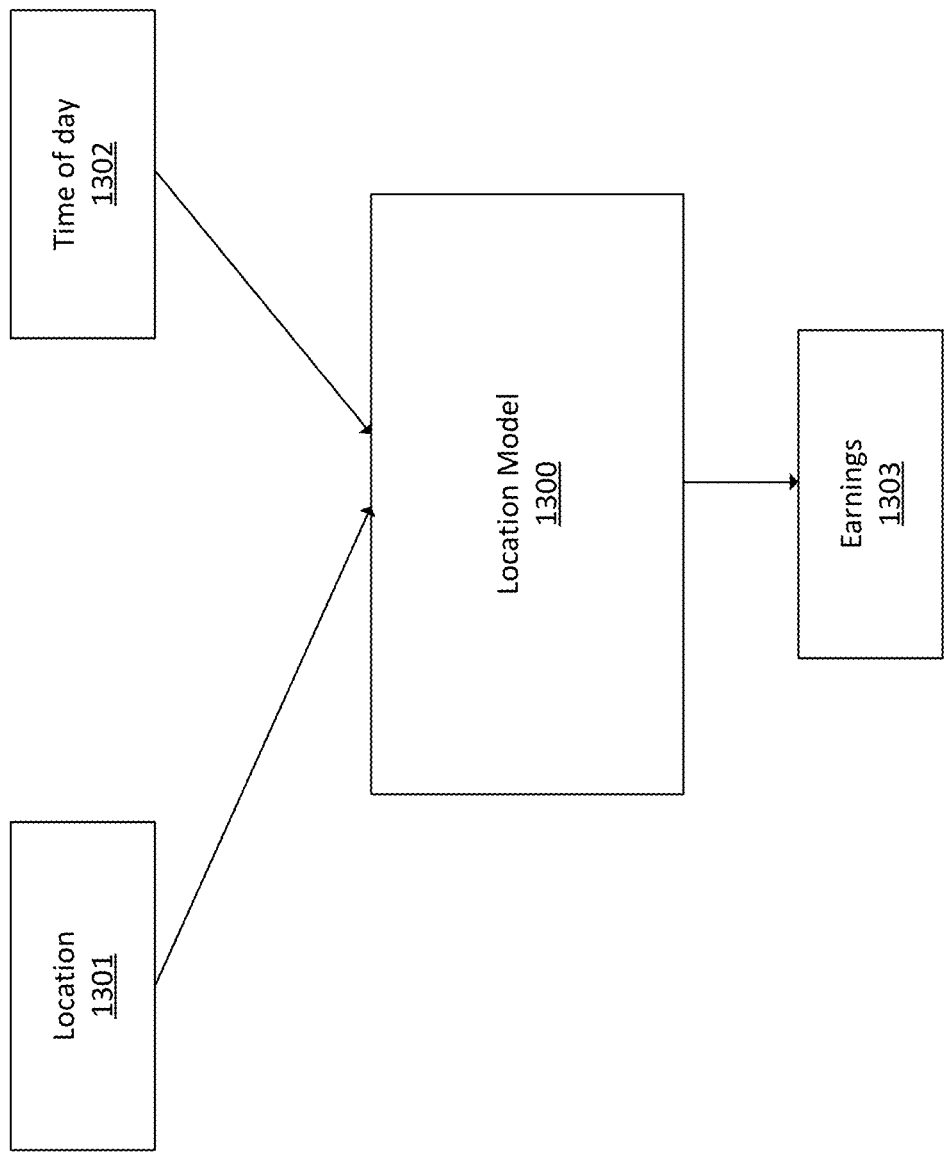
FIG. 13 illustrates an exemplary location model that may be used in some embodiments to recommend locations for the driver.

FIG. 13 illustrates an exemplary location model 1300 that may be used in some embodiments to recommend locations for the driver to wait, based on the time of day, to maximize earnings. In one embodiment, the location model 1300 accepts as input a location 1301 and a time of day 1302. Based on the inputs, the location model 1300 may predict earnings 1302 by applying its internal model parameters. In one approach, a plurality of locations in the driver's geographic area may be input to the location model 1300 to predict the expected earnings in each location. The highest earning location(s) may be recommended to the user. In other embodiments, the distance of the locations from the user may also be weighted so that a location is recommended based both on expected earnings and the distance of the driver to travel to the location. In some embodiments, the recommended locations may be displayed to the user as a map or a heatmap to show using different colors or graphical indications the high earning and low earning areas. In other embodiments, the Mystro app may generate GPS directions for the user to drive to a higher earning area. In some embodiments, the location model 1300 may be a machine learning model such as linear regression, logistic regression, neural networks, random forests, Bayesian classification, reinforcement learning, support vector machines (SVMs), genetic algorithms, or any other model that can be customized based on training data.

The location model 1300 may be trained using training examples, where the training examples may comprise input values of the same type as those used during inference, as described elsewhere. The training examples may also comprise an output label that indicates the desired output of the model. In some examples, the output label may comprise a numerical value representing the earnings of the driver, either from a trip or on an hourly basis. Using the output labels the location model 1300 may be trained to predict earnings based on location and time of day. In one example of training the location model 1300, the training examples are input to the location model 1300, and the outputs of the location model 1300 are compared with the output labels. The differences between the outputs of the location model 1300 and the output labels are used to adjust the internal model parameters of the location model 1300 to make it more accurate in predicting the output labels of the training examples.

Mystro may include an option to turn on other rideshare apps when a threshold time to complete is reached for the current trip. This option may allow the user to receive new trips when he or she is close to completing the current trip, and thus reduce down time between trips. The threshold time may be configured by the user. The time to complete the current trip may be computed based on the distance of the vehicle to the drop off point and traffic.

Mystro may also offer a last ride mode, which signs off a ride share app while one or more trips is in progress. The last ride mode may allow the user to prevent undesired trips. The last ride mode may be disabled once the trip is complete so that the driver may continue to receive trips based on their settings.

Mystro may optionally cancel some trips immediately upon acceptance by the rideshare app. This feature may be useful because some rideshare apps only provide destination information after a trip is accepted. Thus, a trip must be accepted to determine if the trip is worthwhile, and may be canceled by Mystro in certain examples. For example, Mystro may detect that the trip is too near or too far based on user preferences or may detect that accepting the trip will not optimize the driver's hourly earnings, based on optimization model 1200. In those situations, Mystro may automatically cancel a trip immediately after it has been accepted by a rideshare app. In addition, Mystro may store a cancellation rate limit, which disables the auto-cancellation feature once the cancellation rate limit is approached or exceeded. The cancellation rate limit may be based on cancellation limits imposed by rideshare apps and which lead to adverse action against the driver.

Figure 14:
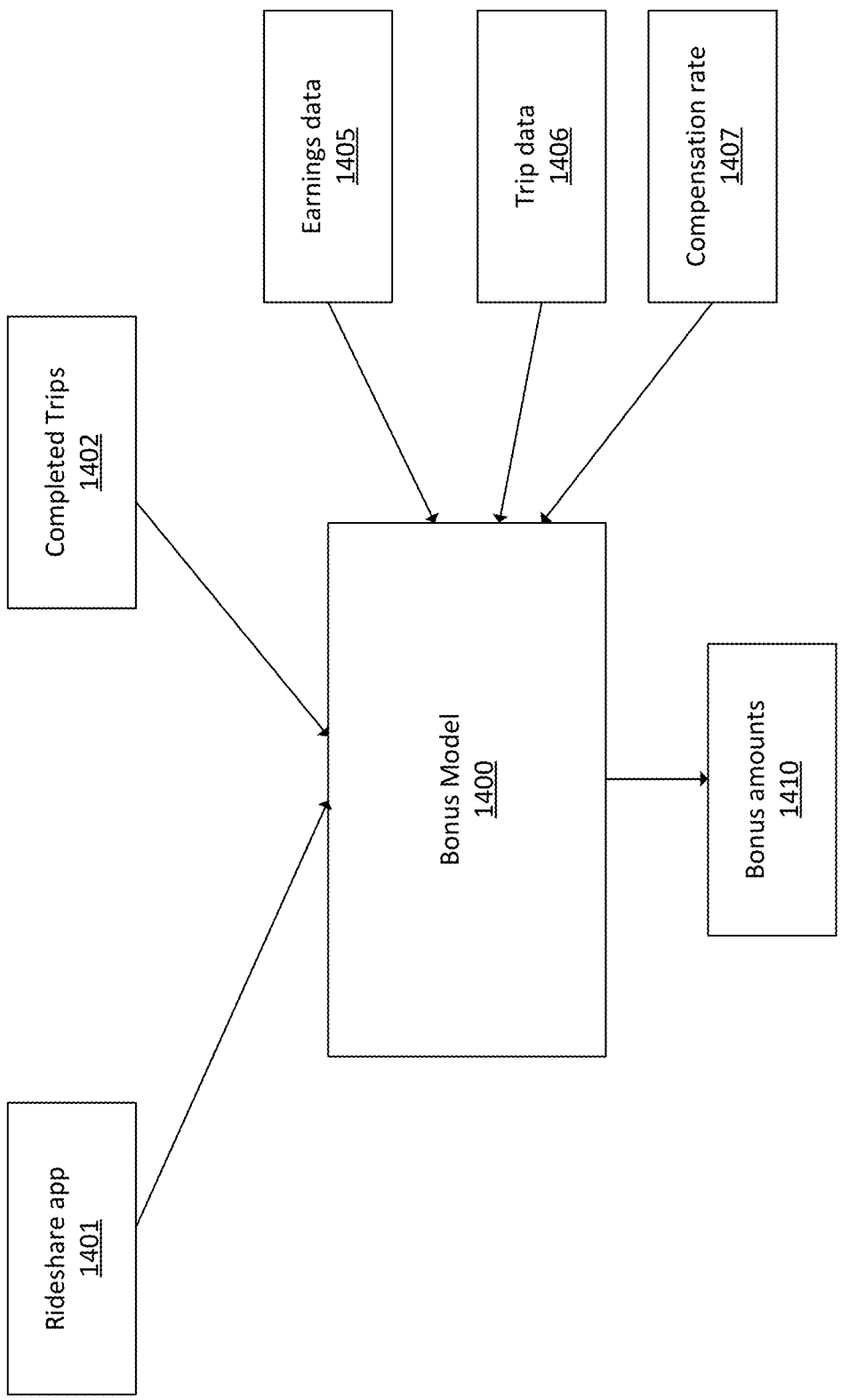
FIG. 14 illustrates an exemplary bonus model that may be used in some embodiments to predict the bonus that will be given to a driver.

FIG. 14 illustrates an exemplary bonus model 1400 that may be used in some embodiments to predict the bonus that will be given to a driver on a given rideshare app for completing a predefined number of trips. The bonus model

1400 may accept as input an identifier of the rideshare app 1401 and a number of completed trips 1402 and output a prediction of a bonus 1410. The bonus model 1400 may be built based on earnings data 1405 from a plurality of other users and their trip data 1406. The compensation rate 1407 of the rideshare app 1401 may also be provided. The compensation rate 1407 may comprise the amount of compensation provided by the rideshare app 1401 per minute or per mile. Based on the earnings data 1405, trip data 1406, and compensation rate 1407, the bonus model 1400 may be generated to predict the bonus amounts provided to the other drivers. The model may be computed by taking the difference between the actual earnings data 1405 and the amount of earnings that would have been predicted based on the trip data 1406 and the compensation rate 1407. In some embodiments, the bonus model 1400 may be a machine learning model such as linear regression, logistic regression, neural networks, random forests, Bayesian classification, reinforcement learning, support vector machines (SVMs), genetic algorithms, or any other model that can be customized based on training data.

Figure 15:
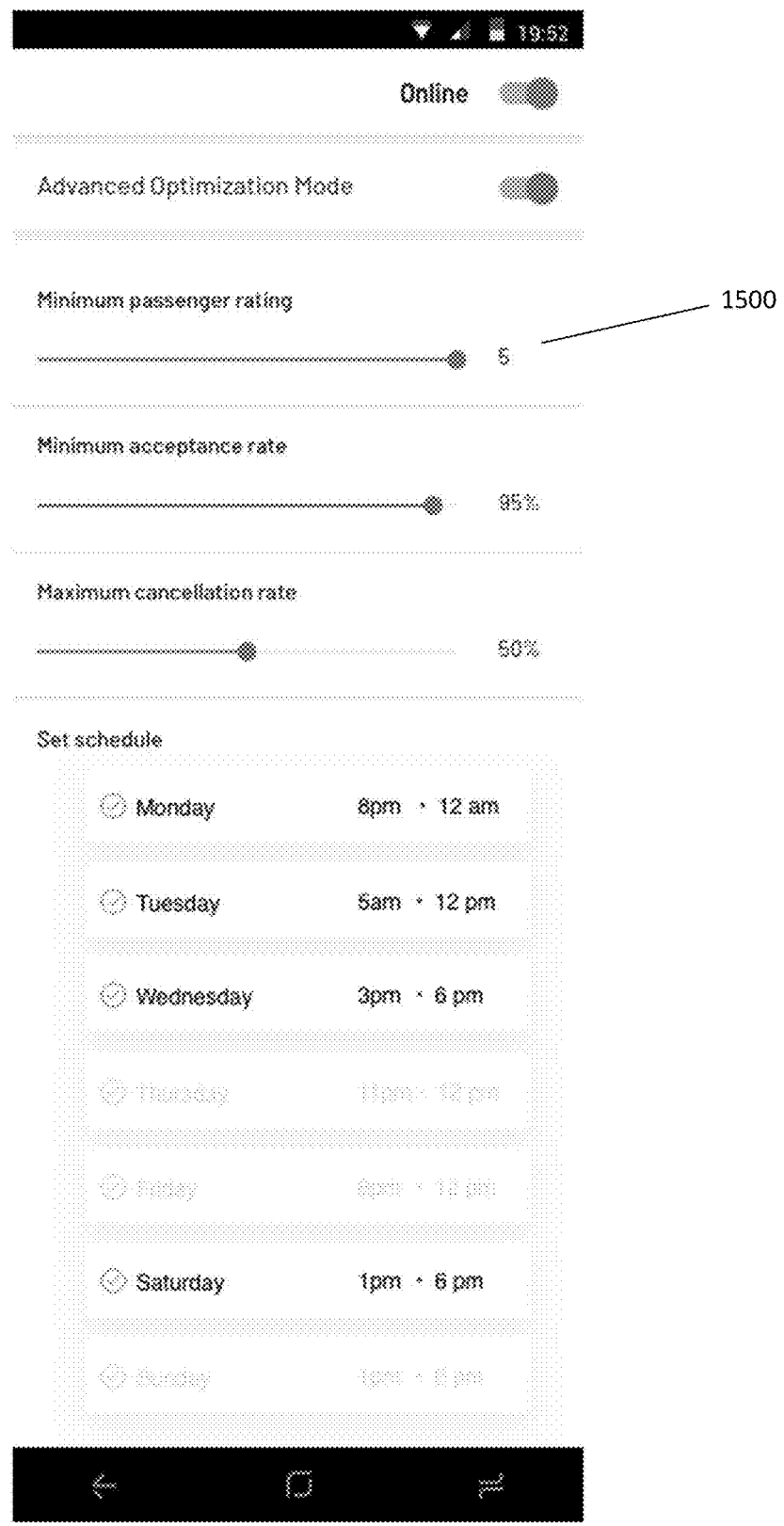
FIG. 15 illustrates the exemplary user configuration of options for customizing the automatic acceptance and cancellation of trips with the optimization model.

FIG. 15 illustrates the exemplary user configuration of options for customizing the automatic acceptance and cancellation of trips with the optimization model 1200. In an embodiment, optimization screen 1500 allows the user to customize the operation of the optimization model 1200 for automatically accepting trips and automatically cancelling trips. A minimum passenger rating allows the user to set a minimum rating that passengers must have for a trip to be accepted. If a passenger does not have the minimum rating, the trip may not be accepted or may be cancelled. A minimum acceptance rate may allow the user to set a minimum rate at which Mystro accepts incoming trips. A maximum cancellation rate may allow the user to set a maximum rate at which Mystro cancels accepted trips. In addition, user interface elements may be provided to allow the user to set a schedule in which the user will be working. Based on the aforementioned inputs, the optimization model may optimize the trips accepted and cancelled to increase the user's hourly earnings.

In one embodiment, trips may be provided to drivers through the Mystro aggregation platform and be managed by Mystro directly. The Mystro app may provide trips to the drivers from rideshare platforms via an application programming interface (API).

In one embodiment, Mystro may allow drivers to accept a minimum hourly pay for a predefined period to be available for requests on a single rideshare app. The Mystro API may automatically check if the driver meets matching criteria of a rideshare app for the minimum hourly pay, and offer this to the driver if the criteria are met. In one embodiment, the Mystro optimization model 1200 may automatically accept the offers of minimum hourly pay from a rideshare app if the optimization model determines that the driver will have higher earnings. In other embodiments, the acceptance of the minimum hourly pay offer is made based on manually configured settings.

In one embodiment, Mystro may provide single onboarding flow that allows the driver to sign up with a plurality of ridesharing apps. The single onboarding flow may comprise a background check. The onboarding flow and background check may allow the driver to receive trips from a plurality of rideshare apps through Mystro.

Figure 16:
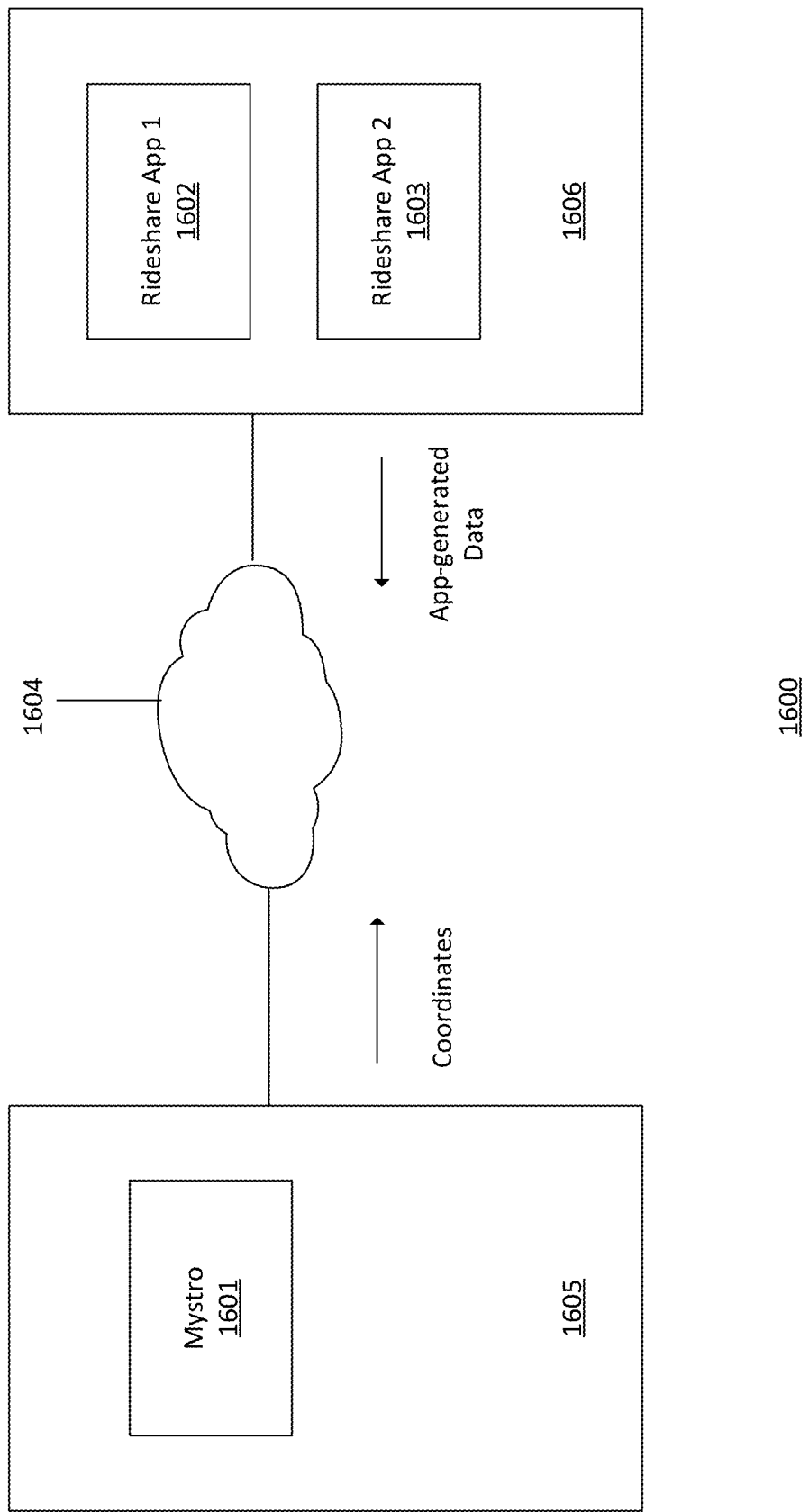
FIG. 16 illustrates one exemplary network environment where some embodiments may operate.

FIG. 16 illustrates one exemplary network environment 1600 where some embodiments may operate. In one embodiment, the Mystro app 1601 and one or more rideshare apps 1602, 1603 that interface with it operate on different computer systems. The Mystro app may operate on a local device 1605 of the driver, such as a mobile phone, tablet, or other computer device located in the vehicle. In some embodiments, rideshare apps such as Uber, Lyft, Gett, and Juno may operate on the same local device. In other embodiments, the rideshare apps 1602, 1603 may operate on a separate, remote device 1606. For example, the one or more rideshare apps that are managed by the Mystro app may operate on a device farm, which may be a centrally-located facility with a plurality of devices dedicated to running apps. In some embodiments, the mobile device running the Mystro app may be a different type of mobile device or be running a different, non-compatible operating system to the mobile device that the rideshare apps are running on. For example, the Mystro app may be running on an iOS device, such as an iPhone, and the rideshare apps may be running on Android devices, such as a Google Pixel. In some embodiments, separate mobile devices may be used for each rideshare app. For example, Lyft may be run on a first remote mobile device and Uber may be run on a second remote mobile device, where the first and second remote mobile devices may be separate.

In another example, the one or more rideshare apps 1602, 1603 that are managed by Mystro may be emulated on a server. That is, the rideshare apps may not operate on a mobile device at all, but instead may be run on an emulator of a mobile device on a server computer, where the server computer is not a mobile device. Emulating the rideshare apps on a server computer may be more efficient than running the rideshare apps on a mobile device.

In embodiments where the Mystro app 1601 is run locally and the rideshare apps 1602, 1603 are run remotely, the Mystro app may determine the location coordinates of the user from a location system, such as GPS, and transmit the location coordinates over a network 1604, such as the Internet, to the rideshare apps that are running remotely. The rideshare apps may receive the transmitted GPS data and emulate the location of the user using the provided GPS coordinates in the rideshare app. The GPS coordinates may be injected into the rideshare apps through an API or by feeding the GPS coordinates into the rideshare app 1602 as if they were coming from a local GPS unit. The rideshare app 1602 operates as if it were running at the location of the user, even though the rideshare app 1602 is running remotely. The rideshare app 1602 may then receive trip requests based on the received GPS coordinates. Moreover, the rideshare app 1602 may perform all other functionality as if it was at that location, such as providing navigation instructions, selecting pick up and drop off locations, and so on. The rideshare app may transmit all or some of this data, including the trip requests, to the Mystro app 1601. This transmission may occur over a network 1604, such as the Internet. The Mystro app 1601 may then manage the rideshare apps 1602, 1603 just as if they were being run locally on the driver's device. For example, the Mystro app 1601 may treat the trip requests the same as if they were being generated by an app running on the driver's local device.

Figure 17:
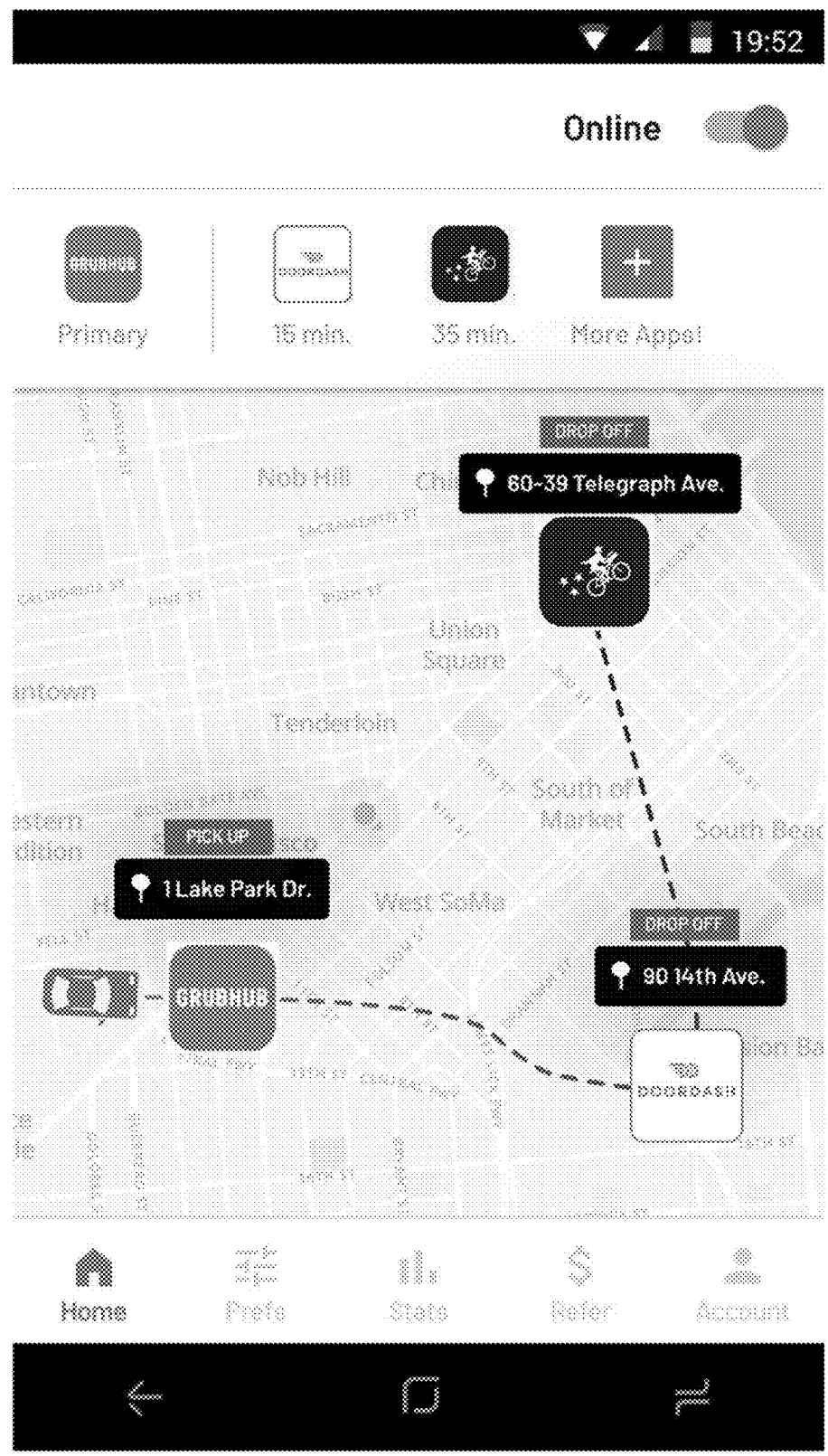
FIG. 17 illustrates an example of an interface for the Mystro app to display a route for picking up and dropping off deliveries for a plurality of services on a single route.

While described above in the context of rideshare services, it should be understood that the techniques and methods herein may also be used for driver services for deliveries, such as deliveries of food or packages, on a plurality of delivery platforms. The same techniques described above may be used except that pick up locations define a pick up point for the delivery and drop off locations defined a drop off location for the delivery, instead of for a passenger. In one embodiment, the Mystro app may accept delivery trips from a plurality of different delivery apps simultaneously. For example, delivery apps include Grubhub, Door Dash, Instacart, Postmates, Uber Eats, and others. The Mystro app may generate a route to complete all of the accept deliveries, some from different apps, in the shortest amount of time. Pathfinding algorithms such as Dijkstra's algorithm, A*, and Rapidly Exploring Random Trees (RRT) may be used. The generated route will visit the pickup and drop off point of each delivery, subject to the constraint that each delivery must be picked up before it may be dropped off. The recommended route may be updated dynamically as new delivery trips are accepted. The route may be updated by adding pick up and drop off locations dynamically. Moreover, deliveries may be weighted by urgency. For example, food may be weighted more highly than packages because delivery times for food are more sensitive. FIG. 17 illustrates an example of an interface for the Mystro app to display a route for picking up and dropping off deliveries for a plurality of services on a single route.

The above techniques regarding deliveries may also be applied in the Mystro app to trips for picking up and dropping off passengers. Mystro may consolidate and generate optimal routes for shared trips across a plurality of rideshare applications. When accepting trips from multiple rideshare applications, Mystro may automatically enter last ride mode to prevent more passengers from being accepted than can fit in the user's vehicle.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed:

1. A computer-implemented method for operating a plurality of rideshare applications comprising: monitoring, by an on-demand driver aggregation platform, a first rideshare application and a second rideshare application for ride requests;
receiving, by the on-demand driver aggregation platform, a first ride request from the first rideshare application;
accepting the first ride request in order to initiate a trip;
checking the activation status of the second rideshare application;
determining that the second rideshare application is active;
disabling the second rideshare application during the trip to prevent a second ride request from the second rideshare application from being received;
wherein the on-demand driver aggregation platform running on a driver's mobile device in a vehicle and the first and second rideshare applications running on a remote central device that is separate from the driver's mobile device;
transmitting, by the driver's mobile device, GPS coordinates to the remote central device;
emulating, by the remote central device, a user location to the first and second rideshare applications based on the GPS coordinates;
generating, by the remote central device, the first ride request and transmitting it to the driver's mobile device.

2. The computer-implemented method of claim 1, further comprising:
determining one or more characteristics of the trip from the first ride request;
comparing the characteristics of the trip to a plurality of filters;
determining whether to accept the first ride request based on the filters.

3. The computer-implemented method of claim 1, further comprising:
during the trip, computing an estimated time to drop off;
when the estimated time to drop off is below a threshold, activating the second rideshare application to allow the second ride request from the second rideshare application to be received.

4. The computer-implemented method of claim 1, further comprising:
determining one or more characteristics of the trip from the first ride request;
inputting the one or more characteristics of the trip into an optimization model, the optimization model outputting a recommendation to accept or reject the first ride request;
accepting the first ride request in accordance with the recommendation of the optimization model.

5. The computer-implemented method of claim 4, wherein the one or more characteristics of the trip input to the optimization model include a location of a driver, a location of a pick-up point, an identifier of the first rideshare application, and an identity of a rideshare service level, and a surge price.

6. The computer-implemented method of claim 5, wherein the optimization model is a machine learning model and the optimization model is trained on training examples comprising training inputs comprising data about a plurality of trips and training labels comprising desired outputs.

7. The computer-implemented method of claim 1, further comprising:
receiving user configuration of a plurality of common filters for filtering ride requests;
filtering ride requests from the first rideshare application and the second rideshare application based on the common filters.

8. The computer-implemented method of claim 1, further comprising:
determining one or more characteristics of the trip from the first ride request;
using a trained bonus model to generate a bonus prediction, the bonus prediction comprising a prediction of the bonus associated with the trip based on the characteristics of the trip;
inputting the bonus prediction into an optimization model, the optimization model outputting a recommendation to accept or reject the first ride request;
accepting the first ride request in accordance with the recommendation of the optimization model.

9. The computer-implemented method of claim 1, further comprising:
  storing earnings data from each trip from the first ride sharing application and the second ride sharing application;
  displaying aggregated statistics about driver earnings based on the stored earnings data.

10. A non-transitory computer-implemented method for operating a plurality of rideshare applications comprising:
  monitoring, by an on-demand driver aggregation platform, a first rideshare application and a second rideshare application for ride requests;
  receiving, by the on-demand driver aggregation platform, a first ride request from the first rideshare application;
  accepting the first ride request in order to initiate a trip;
  checking the activation status of the second rideshare application;
  determining that the second rideshare application is active;
  disabling the second rideshare application during the trip to prevent a second ride request from the second rideshare application from being received;
  wherein the on-demand driver aggregation platform running on a driver's mobile device in a vehicle and the first and second rideshare applications running on a remote central device that is separate from the driver's mobile device;
  transmitting, by the driver's mobile device, GPS coordinates to the remote central device;
  emulating, by the remote central device, a user location to the first and second rideshare applications based on the GPS coordinates;
  generating, by the remote central device, the first ride request and transmitting it to the driver's mobile device.

11. The non-transitory computer-readable medium of claim 10, further comprising instructions for: determining one or more characteristics of the trip from the first ride request;
  comparing the characteristics of the trip to a plurality of filters;
  determining whether to accept the first ride request based on the filters.

12. The non-transitory computer-readable medium of claim 10, further comprising instructions for: during the trip, computing an estimated time to drop off, when the estimated time to drop off is below a threshold, activating the second rideshare application to allow the second ride request from the second rideshare application to be received.

13. The non-transitory computer-readable medium of claim 10, further comprising instructions for: determining one or more characteristics of the trip from the first ride request;
  inputting the one or more characteristics of the trip into an optimization model, the optimization model outputting a recommendation to accept or reject the first ride request;
  accepting the first ride request in accordance with the recommendation of the optimization model.

14. The non-transitory computer-readable medium of claim 13, wherein the one or more characteristics of the trip input to the optimization model include a location of a driver, a location of a pick-up point, an identifier of the first rideshare application, and an identity of a rideshare service level, and a surge price.

15. The non-transitory computer-readable medium of claim 14, wherein the optimization model is a machine learning model and the optimization model is trained on training examples comprising training inputs comprising data about a plurality of trips and training labels comprising desired outputs.

16. The non-transitory computer-readable medium of claim 10, further comprising instructions for: receiving user configuration of a plurality of common filters for filtering ride requests; filtering ride requests from the first rideshare application and the second rideshare application based on the common filters.

17. The non-transitory computer-readable medium of claim 10, further comprising instructions for: determining one or more characteristics of the trip from the first ride request;
  using a trained bonus model to generate a bonus prediction, the bonus prediction comprising a prediction of the bonus associated with the trip based on the characteristics of the trip;
  inputting the bonus prediction into an optimization model, the optimization model outputting a recommendation to accept or reject the first ride request;
  accepting the first ride request in accordance with the recommendation of the optimization model.

18. The non-transitory computer-readable medium of claim 10, further comprising instructions for: storing earnings data from each trip from the first ride sharing application and the second ride sharing application;
  displaying aggregated statistics about driver earnings based on the stored earnings data.

* * * * *